United States Patent [19]
Heighway et al.

[11] 4,059,763
[45] Nov. 22, 1977

[54] ELECTRON BEAM CURRENT, PROFILE AND POSITION MONITOR

[75] Inventors: Edward A. Heighway; Kenneth J. Hohban; Stanley O. Schriber, all of Deep River, Canada

[73] Assignee: Atomic Energy of Canada Limited, Ottawa, Canada

[21] Appl. No.: 746,133

[22] Filed: Nov. 30, 1976

[30] Foreign Application Priority Data

Mar. 2, 1976 Canada ............................ 246958

[51] Int. Cl.$^2$ ............................................. G01T 1/16
[52] U.S. Cl. ................................... 250/336; 250/305; 250/370
[58] Field of Search ............... 250/305, 336, 361, 370, 250/371, 374, 396, 397, 398

[56] References Cited
U.S. PATENT DOCUMENTS 2,814,730  11/1957  Fechter ............................ 250/305 X
3,293,429  12/1966  Leboutet et al. ................. 250/305 X Primary Examiner—Davis L. Willis
Attorney, Agent, or Firm—Edward Rymek

[57] ABSTRACT

The electron beam monitor includes two long, thin foil elements which are sequentially moved through an electron beam to be measured, in directions transverse to the beam and perpendicular to one another. The electron beam striking the elements produces forward directed bremsstrahlung radiation that is detected by a series of detectors which are positioned circumferentially about the beam path. A measuring circuit measures the radiation intensity as a function of the foil position to provide beam current, profile and position information. To simultaneously monitor a second beam travelling in a direction opposite to the first beam, a second series of detectors are positioned circumferentially about the beam path to detect forward directed radiation produced by the second electron beam as it strikes the foils.

10 Claims, 3 Drawing Figures

ELECTRON BEAM CURRENT, PROFILE AND POSITION MONITOR

This invention is directed to an electron beam monitor for measuring the intensity, spatial distribution and mean position of pulsed or DC electron beams.

In the operation of beam current devices such as electron accelerators, the various parameters of the electron beam generated need to be monitored to provide data which is necessary to achieve optimum performance and to effectively control the accelerator system. Various devices for measuring beam current, profile and position individually or simultaneously are presently in use, some of these are directly intercepting and therefore alter the beam characteristics. These devices are not satisfactory since the output beam cannot be used while the measurement is being made. Others are non-intercepting and measure the beam parameters by the magnetic and electric effects of the beam. These can only measure the parameters of a single beam.

It is therefore an object of this invention to provide a beam monitor which interacts directly with the beam in a minimal manner.

It is a further object of this invention to provide a beam monitor for monitoring beams that are travelling in opposite directions and whose cross-sections may overlap.

It is another object of this invention to provide a beam monitor for monitoring beam current, profile and position.

These and other objects are achieved in a monitor which includes a thin foil element mounted on a frame with means connected to the frame to scan the foil through the electron beam in a plane perpendicular to the beam such that the foil interacts with the electron beam to produce bremsstrahlung radiation. The monitor further includes a series of radiation detectors which measure the bremsstrahlung radiation intensity. These are positioned about the beam path at a distance displaced from the foil in the direction of beam travel. The radiation intensity is detected as a function of foil position in the beam and provides the required information for determining beam current, profile and position. The surface of the foil element facing the incoming beam has a length $l$, where $l$ is greater than the beam width and a width $w$, where $w$ is much smaller than the beam width, thus obtaining interaction with the beam and avoiding undue interference with the beam.

To obtain further data regarding the electron beam, a second foil similar to the first, may be sequentially moved transversely through the beam in a direction substantially perpendicular to the direction of movement of the first foil.

To simultaneously monitor a second beam travelling in the opposite direction to the first beam, a second series of radiation detectors are positioned about the beam path at a distance displaced from the foil in the direction of travel of the second beam. These detectors will measure the bremsstrahlung radiation intensity produced by the second electron beam as it strikes the foils.

Figure 1:
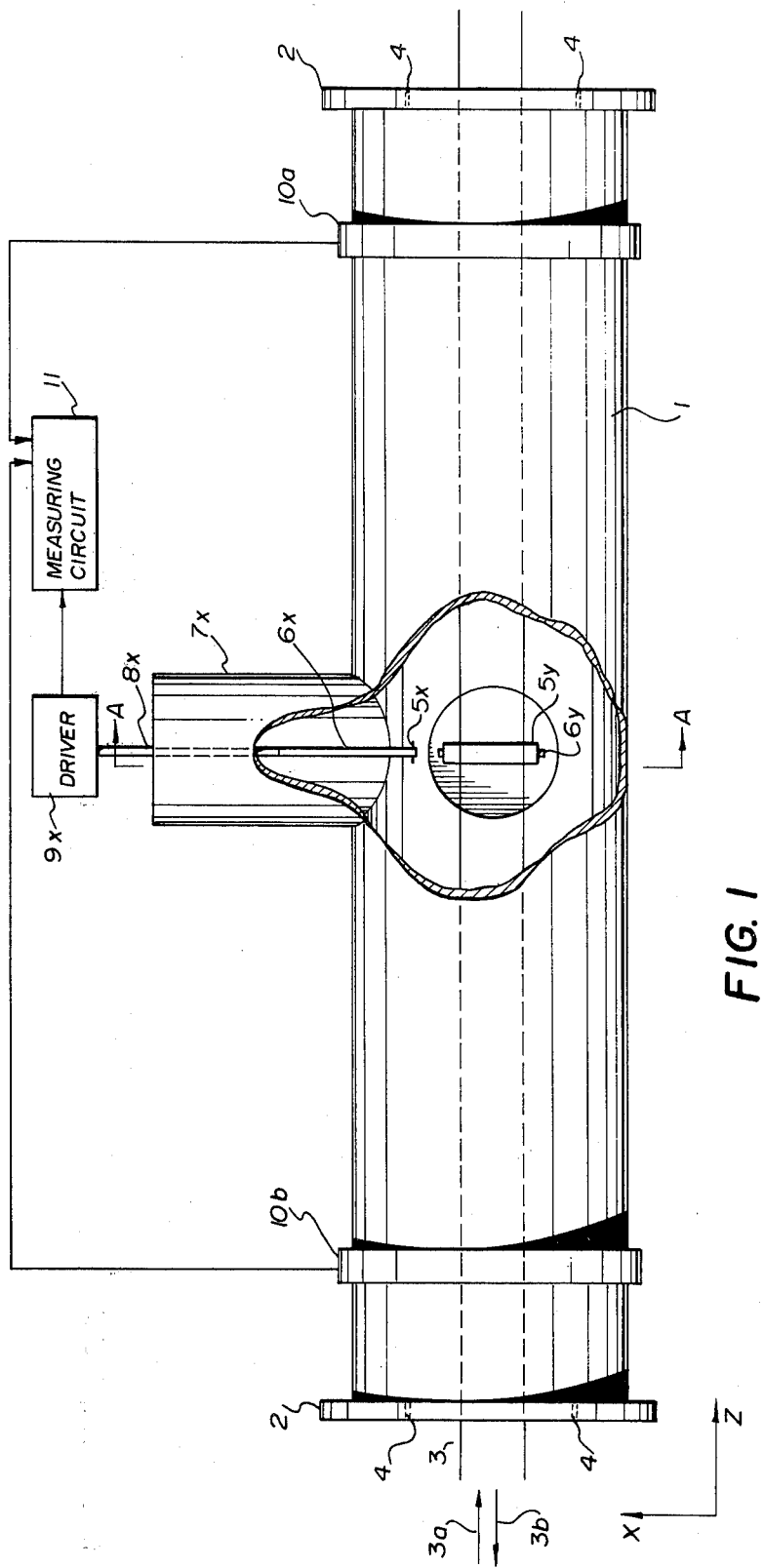
FIG. 1 illustrates the electron beam monitor in accordance with this invention.
Figure 2:
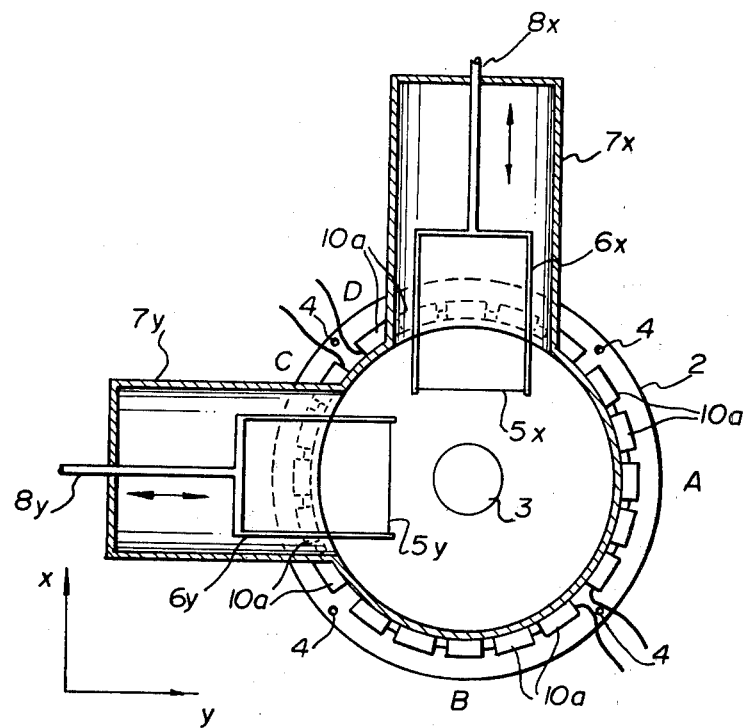
FIG. 2 is a cross-section view of the monitor shown in FIG. 1.

The electron beam monitor in accordance with this invention is shown in FIGS. 1 and 2, where FIG. 2 is a cross-section taken along A—A in FIG. 1. It includes a vacuum pipe 1 with flanges 2 at each end for connecting the monitor into an electron beam system such that the electron beam path 3 passes through pipe 1 in the z-direction along its length. The flanges 2 include holes 4 through which fasteners are passed to assure a vacuum seal connection into the system. An electron beam 3a may travel along the path 3 in one direction as indicated by arrow 3a and/or a second beam 3b may travel in a direction opposite the beam 3a as indicated by arrow 3b. The electron beams 3a and 3b may travel along the same or different axes and may have different cross-section profiles and dimensions. Thus the cross-sections of beams 3a and 3b may either, not overlap, or overlap partially or totally.

Figure 3:
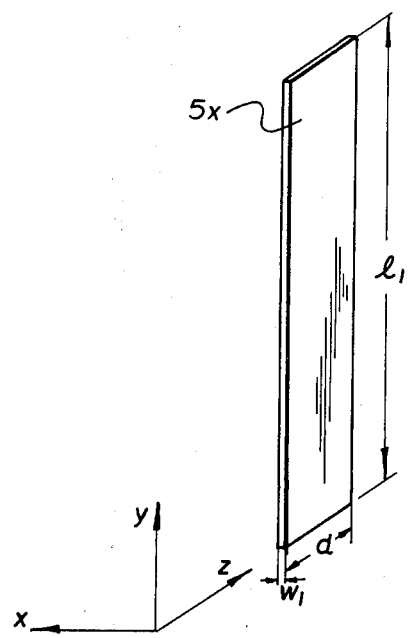
FIG. 3 illustrates a foil used in the monitor.

To monitor beam 3a in the x-direction, a thin foil element 5x is mounted on a frame 6x which is housed within a vacuum chamber 7x. The frame 6x includes a linear vacuum feed-through arm 8x by which the frame 6x and foil 5x may be linearly oscillated through the beam 3a by a mechanical driver 9x. The frame 6x is preferably large enough so as not to interact with the beam as the foil 5x is moved through the beam 3a. The foil 5x is made of conventional material which produces bremsstrahlung radiation when bombarded by electrons, and which preferably has an atomic number so as to produce forward peaked radiation. As shown in FIG. 3, the surface of the foil 5x which faces the electron beam moving in the z-direction has a length $l_1$ and a width $w_1$. The length $l_1$ is chosen such that it is much greater than the width at the beam 3a, thus a slice across the entire width of beam 3a will interact with the foil 5x and the beam will not strike the frame 6x even if the beam 3a is not centered within the tube 1. The width $w_1$ of the foil 5x is very thin, in order of 1% of the beam width, to provide a minimum amount of beam interference as the foil 5x is moved through the beam 3a, while at the same time, it will provide a sufficient cross-section to the beam 3a for adequate beam interaction. The depth $d$ of the foil 5x is the z-direction is chosen to produce optimum intensity of bremsstrahlung radiation, particularly in the forward direction toward the radiation detectors 10a.

A number of interconnected bremsstrahlung radiation detectors 10a are spaced around the circumference of the vacuum pipe 1 in the forward direction from foil 5x to detect radiation produced by foil 5x as it is bombarded by electrons in beam 3a. The detectors 10a may be of any type, however semi-conductor diodes which produce output currents proportional to the incident radiation are preferred as they do not require a biasing voltage and they only need a high impedance device such as an oscilloscope or a current meter to take output readings. The number of diode detectors 10a required will depend on desired sensitivity.

In operation, the linear driver 9x moves the foil 5x through the beam 3a. As the foil 5x enters the beam 3a bremsstrahlung radiation is produced. The radiation intensity is proportional to the intercepted beam 3a current and its angular distribution in strongly forward directed. For 20 MeV electrons and tantalum foil 5x where $d \simeq 0.1$ cm and $w \simeq 0.002$ cm, the radiation intensity in the direction opposed to the electron beam direction is $\simeq 20$ db less intense than the forward directed radiation. Detectors 10a detect the forward directed radiation and provide an output signal to circuit 11.

Measurement of the bremsstrahlung intensity as a function of the position of the foil 5x along the x-axis gives an accurate beam profile in the x-direction.

The detectors 10a may all be connected in parallel to a measuring circuit 11, however it is preferred that the detectors 10a be electrically separated into four equal quadrants A, B, C, and D as shown in FIG. 2. The quadrant closer to the beam will receive a higher bremsstrahlung radiation, and in this way the position of the beam relative to the centre of pipe 1 can be determined. In addition, the summation of the total output from the four groups of detectors 10a gives a measure of the total beam current. Calibration of this output as a function of current by independent current measurements using a Faraday cup allows quantitative measurements of beam currents.

To simultaneously monitor an electron beam 3b travelling in the direction opposite to beam 3a, a second set of detectors 10b, similar to detectors 10a, are spaced around the circumference of the vacuum pipe 1 in the forward direction from foil 5x for beam 3b, to detect the radiation produced by foil 5x by electrons in beam 3b. As with respect to beam 3a described above, the angular distribution of the radiation produced by beam 3b is strongly forward directed. Since the forward directed radiation is so much more intense than the reverse radiation, the detector 10a will only receive a small fraction $f$ of the radiation produced by beam 3b and received by detectors 10b, and similarly the detectors 10b will only receive a small fraction $f$ of the radiation produced by a beam 3a and received by detectors 10a. Since the fraction $f$ is small, the two beams can be monitored simultaneously. For greater precision, the reading from detectors 10a and 10b may be adjusted by subtracting a fraction $f$ of the detectors 10a reading from the detectors 10b reading and by subtracting a fraction $f$ of the detectors 10b reading from the detectors 10a reading.

In order to further define the beams 3a and 3b, a second foil 5y, having a surface of length $l_2$ and width $w_2$ facing the beams, similar to foil 5x, may be linearly oscillated through the beams 3a and 3b in the y-direction such that its length $l_2$ is in the x-direction, and its width $w_2$ is in the y-direction. As with foil 5x, foil 5y may be mounted on a frame 6y which is housed within a vacuum chamber 7y, and which includes a linear vacuum feed-through arm 8y that is connected to a mechanical driver 9y. The mechanical driver 9y is electrically connected to the measuring circuit 11.

Mechanical drivers 9x and 9y are controlled to sequentially move foils 5x and 5y through the beams 3a and 3b. During this operation detectors 10a provide sequential sets of signals due to radiation produced by foils 5x and 5y to circuit 11 to define beams 3a, and detectors 10b provide sequential sets of signals due to radiation produced by foils 5x and 5y to circuit 11 to define beam 3b. These signals may be recorded or applied to a CRT to provide a visual indication of the current, profile and positions of the beams 3a and 3b.

We claim:

1. An electron beam monitor comprising:
  a. foil means having surface of width $w_1$ and length $l_1$ where $w_1$ is smaller than the electron beam cross-section and $l_1$ is greater that the electron beam cross-section, said foil means producing bremsstrahlung radiation when the surface is struck by electrons from the electron beam;
  b. means for moving the foil means transversely through the electron beam path with the surface facing the electron beam;
  c. radiation detector means located circumferential about the beam path at a distance displaced from the foil means in the direction of beam travel for detecting radiation from the foil means produced by the electron beam; and
  d. means for measuring the intensity of the radiation detected as a function of the position of the foil means in the beam path.

2. An electron beam monitor as claimed in claim 1 which further includes:
  a. second foil means having a surface of width $w_2$ and length $l_2$ where $w_2$ is smaller than the electron beam cross-section and $l_2$ is greater than the beam cross-section, said second foil means producing bremsstrahlung radiation when the surface is struck by electrons from the electron beam;
  b. second means for moving the second foil means transversely through the electron beam path in a direction substantially perpendicular to the direction of movement of the first foil means.

3. An electron beam monitor as claimed in claim 1 wherein the foil consists of material having an atomic number which will produce primarily forward directed radiation.

4. An electron beam monitor as claimed in claim 1 wherein the moving means includes frame means connected to said foil means and mechanical driver means connected to said frame means for moving the foil transversely across the beam path.

5. An electron beam monitor as claimed in claim 1 wherein said detector means includes a number of symmetrically spaced electrically connected radiation detectors.

6. An electron beam monitor as claimed in claim 5 wherein said detectors are semiconductor diodes for producing output currents proportional to incident radiation.

7. An electron beam monitor as claimed in claim 5 wherein said detectors are electrically connected into four equal quadrant groups.

8. An electron beam monitor as claimed in claim 1 wherein the width $w$ of the foil is approximately 1% of the electron beam width.

9. Apparatus for monitoring a first and second electron beam travelling in opposite directions comprising:
  a. foil means having opposite surfaces of width $w_1$ and length $l_1$, where $w_1$ is smaller than the electron beam cross-sections and $l_1$ is greater than the electron beam cross-sections, said foil means producing bremsstrahlung radiation when the surface is struck by electrons from an electron beam;
  b. means for moving the foil means transversely through the electron beam paths with the surfaces facing the electron beams;
  c. first radiation detector means located circumferential about the beam path at a distance displaced from the foil means in the direction of travel of the first beam for detecting radiation from the foil means produced by the first electron beam; and
  d. second radiation detector means located circumferential about the beam path at a distance displaced from the foil means in the direction of travel of the second electron beam for detecting radiation from the foil means produced by the second electron beam; and e. means for measuring the intensity of the radiation detected by the first and second detector means as a function of the position of the foil means in the beam paths.

10. An apparatus as claimed in claim 9 which further includes:

a. second foil means having a surface of width $w_2$ and length $l_2$ where $w_2$ is smaller than the electron beam cross-sections and $l_2$ is greater than the electron beam cross-sections, said second foil means producing bremsstrahlung radiation when the surface is struck by electrons from said electron beams;

b. second means for moving the second foil means transversely through the electron beam paths in a direction substantially perpendicular to the direction of movement of the first foil means.

* * * * *